(12) United States Patent
Xiong

(10) Patent No.: US 12,352,644 B2
(45) Date of Patent: Jul. 8, 2025

(54) ANTI-OVERLOAD SENSOR ELASTIC BODY AND SIX-AXIS FORCE SENSOR

(71) Applicant: CHANGZHOU KUNWEI SENSOR TECHNOLOGY CO., LTD., Jiangsu (CN)

(72) Inventor: Lin Xiong, Jiangsu (CN)

(73) Assignee: CHANGZHOU KUNWEI SENSOR TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 18/765,081

(22) Filed: Jul. 5, 2024

(65) Prior Publication Data

US 2024/0361194 A1 Oct. 31, 2024

Related U.S. Application Data

(63) Continuation of application No. PCT/CN2023/083334, filed on Mar. 23, 2023.

(51) Int. Cl.
*G01L 1/26* (2006.01)
*G01L 1/22* (2006.01)

(52) U.S. Cl.
CPC .............. *G01L 1/26* (2013.01); *G01L 1/2206* (2013.01); *G01L 1/2231* (2013.01); *G01L 1/2287* (2013.01)

(58) Field of Classification Search
CPC ....... G01L 1/26; G01L 1/2206; G01L 1/2231; G01L 1/2287; G01L 5/161–1627;
(Continued)

(56) References Cited

U.S. PATENT DOCUMENTS 8,726,741 B2 * 5/2014 Krippner ............... G01L 3/1457
73/862.041
10,732,060 B2 * 8/2020 Strauss .................. B25J 13/085
(Continued)

FOREIGN PATENT DOCUMENTS

CN 205593682 U 9/2016
CN 109708787 A 5/2019
(Continued)

*Primary Examiner* — Tran M. Tran
(74) *Attorney, Agent, or Firm* — SZDC Law PC

(57) ABSTRACT

The invention relates to the field of sensor technology, and in particular to an anti-overload sensor elastic body in form of an integral structure, in which the anti-overload auxiliary beam is provided with a wire cut groove running through along the length direction of the set axis, the cross section of the wire cut groove in the direction perpendicular to the set axis comprises two parallel boundary lines having a distance less than or equal to 0.18 mm therebetween; and in which the boundary line is one of a curve, a combined line of at least two straight lines, and a combined line of straight line and curve, and is in an axisymmetric or centrosymmetric pattern. In the invention, by providing three anti-overload auxiliary beams and wire cut grooves provided on them, the overload of the sensor in directions other than the set axis is effectively prevented, avoiding destructive damage and increasing the safety of the sensor. When the deformation of the main deformation beams in the direction of the set axis reaches the set value, the six-axis force sensor adopting such elastic body can also realize overload protection in the direction of the set axis, further increasing the safety.

6 Claims, 12 Drawing Sheets

(58) Field of Classification Search
CPC .... G01G 21/24; G01G 21/244; G01G 23/005; G01G 3/1412; G01G 3/12
See application file for complete search history.

(56) References Cited

U.S. PATENT DOCUMENTS

| | | | |
|---|---|---|---|
| 10,866,150 B2* | 12/2020 | Lauzier | B25J 9/0081 |
| 11,035,746 B2* | 6/2021 | Lin | G01L 5/226 |
| 11,085,838 B2* | 8/2021 | Glusiec | G01L 1/2206 |
| 12,092,542 B2* | 9/2024 | Okada | G01L 3/1442 |
| 2002/0178841 A1* | 12/2002 | Kobayashi | G01G 3/141 |
| | | | 73/862.629 |
| 2011/0107850 A1* | 5/2011 | Kim | G01L 5/163 |
| | | | 73/862.041 |
| 2013/0239701 A1* | 9/2013 | Huang | G01L 5/1627 |
| | | | 73/862.045 |
| 2023/0273085 A1* | 8/2023 | Liu | G01L 19/04 |
| | | | 338/2 |
| 2024/0192065 A1* | 6/2024 | Kim | B23H 9/00 |

FOREIGN PATENT DOCUMENTS

| | | |
|---|---|---|
| CN | 113252227 A | 8/2021 |
| CN | 214334089 U | 10/2021 |
| CN | 113939723 A | 1/2022 |
| CN | 215639915 U | 1/2022 |
| CN | 114593850 A | 6/2022 |

* cited by examiner

ANTI-OVERLOAD SENSOR ELASTIC BODY AND SIX-AXIS FORCE SENSOR

This application is a Continuation Application of PCT/CN2023/083334, filed on Mar. 23, 2023, which claims priority to Chinese Patent Application No. 202210500795.7, filed on May 10, 2023, which is incorporated by reference for all purposes as if fully set forth herein.

TECHNICAL FIELD

The invention relates to the field of sensor technology, and in particular to an anti-overload sensor elastic body and a six-axis force sensor.

BACKGROUND

At present, six-axis force sensor has been widely used in many fields such as industrial automation, robotics, and automotive testing, and its function is to measure the force and moment in three directions X, Y and Z in real time.

Patent document CN215573512U describes a six-dimensional force sensor with overload protection structure, which realizes the limiting effect by adding a wire cut groove at the end of the force beam of the sensor. However, there are the following defects in practical application.

The width of the wire cut groove provided in this document is generally not less than 0.18 mm, while the deformation of the sensor in normal use is mostly within 0.10 mm. Therefore, when the protection device works, the sensor has actually exceeded the range of use, causing overload and irreversible damage. The protection device can thus only protect the sensor from being completely damaged and torn.

In view of the above problems, the designer actively researches and innovates based on years of practical experience and professional knowledge in engineering applications of such products, and with the application of theories, in order to create an anti-overload sensor elastic body and a six-axis force sensor.

SUMMARY

The present invention provides an anti-overload sensor elastic body and a six-axis force sensor, which can effectively solve the problems discussed in the background.

To this end, the present invention adopts technical solutions described below.

An anti-overload sensor elastic body in form of an integral structure comprises a rigid boundary block, a rigid boundary ring, three main deformation beams and three anti-overload auxiliary beams;
  wherein the rigid boundary block is provided in the space surrounded by the rigid boundary ring, with an annular space being formed by the outer wall of the rigid boundary block and the inner wall of the rigid boundary ring, wherein the respective main deformation beams and the anti-overload auxiliary beams are uniformly distributed in the annular space around a set axis and connect the rigid boundary ring and the rigid boundary block;
  wherein the anti-overload auxiliary beam is provided with a wire cut groove running through along the length direction of the set axis, the cross section of the wire cut groove in the direction perpendicular to the set axis comprises two parallel boundary lines having a distance less than or equal to 0.18 mm therebetween; and
  wherein the boundary line is one of a curve, a combined line of at least two straight lines, and a combined line of straight line and curve, and is in an axisymmetric or centrosymmetric pattern.

Further, the rigid boundary block protrudes outward relative to the rigid boundary ring in one direction of the set axis, and the rigid boundary ring protrudes outward relative to the rigid boundary block in the opposite direction.

Further, the inner wall of the rigid boundary ring is provided with an annular limiting surface perpendicular to the set axis.

Further, the outer wall of the rigid boundary block is provided with an annular mounting surface perpendicular to the set axis.

Further, the main deformation beam is provided with a deformation cavity running through along the direction of the set axis.

A six-axis force sensor adopting the anti-overload sensor elastic body described above further comprises an overload protection plate, a first end cover, a second end cover and a plurality of strain sensitive elements;
  wherein the overload protection plate is fixedly connected to one end of the rigid boundary block that is indented inwardly relative to the rigid boundary ring, and contacts with the limiting surface when the deformation of the main deformation beam in the direction of the set axis reaches a set value;
  wherein the first end cover is configured to be penetrated by a portion of the rigid boundary block protruding from the rigid boundary ring, and is fixedly connected to one end of the rigid boundary ring, the penetration position being spaced apart from the rigid boundary block;
  wherein the second end cover is fixedly and sealingly connected to the other end of the rigid boundary ring; and
  wherein a mounting cavity accommodating the main deformation beams and the anti-overload auxiliary beams is formed between the first end cover, the second end cover and the rigid boundary ring, and wherein the strain sensitive elements fit against the surface of the main deformation beams.

Further, a flexible sealing structure is provided between the first end cover and the rigid boundary block.

A six-axis force sensor adopting the anti-overload sensor elastic body describe above further comprises a first end cover, a second end cover and a plurality of strain sensitive elements;
  wherein the first end cover is configured to be penetrated by a portion of the rigid boundary block protruding from the rigid boundary ring, and is fixedly connected to one end of the rigid boundary ring, wherein the inner side of the first end cover is spaced apart from the mounting surface, and wherein the first end cover contacts with the mounting surface when the deformation of the main deformation beams in the direction of the set axis reaches a set value;
  wherein the second end cover is fixedly and sealingly connected to the other end of the rigid boundary ring; and
  wherein a mounting cavity accommodating the main deformation beams and the anti-overload auxiliary beams is formed between the first end cover, the second end cover and the rigid boundary ring, and wherein the strain sensitive elements fit against the surface of the main deformation beams.

Further, a flexible sealing structure is provided outside the first end cover to seal the gap between the first end cover and the rigid boundary block.

Further, the sensor comprises an embedded circuit provided in the mounting cavity and fixedly connected to the rigid boundary block.

With the technical solutions of the present invention, the following technical effects can be achieved.

In the invention, by providing three anti-overload auxiliary beams and wire cut grooves provided on them, and by controlling the width of the grooves within 0.18 mm, the overload of the sensor in directions other than the set axis is effectively prevented, avoiding destructive damage and increasing the safety of the sensor. When the deformation of the main deformation beams in the direction of the set axis reaches the set value, the six-axis force sensor adopting such elastic body can also realize overload protection in the direction of the set axis, further increasing the safety.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

Figure 1:
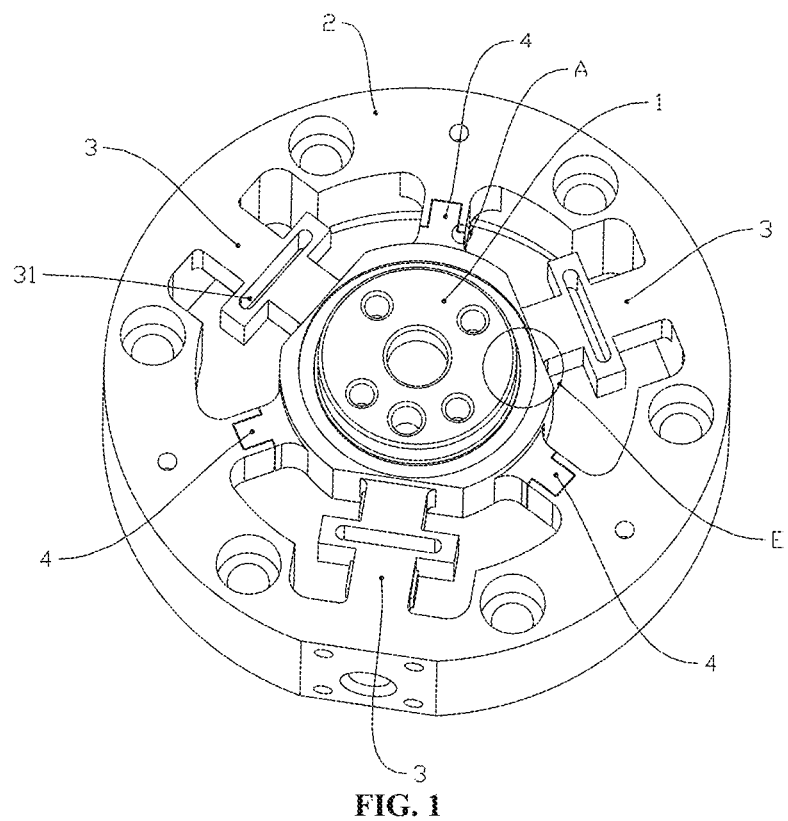
FIG. 1 is a schematic diagram of the structure of the anti-overload sensor elastic body in Embodiment 1 at a first angle.

Reference signs: 1. rigid boundary block; 11. mounting surface; 12. sealing groove; 2. rigid boundary ring; 21. limiting surface; 3. main deformation beam; 31. deformation cavity; 4. anti-overload auxiliary beam; 41. boundary line; 5. set axis; 6. overload protection plate; 7. first end cover; 8. second end cover; 9. strain sensitive element; 10. flexible sealing structure; 101. embedded circuit.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a portion of the embodiments of the present invention, rather than all the embodiments.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

Embodiment 1

FIGS. 1 to 13 illustrate an anti-overload sensor elastic body in form of an integral structure, comprising a rigid boundary block 1, a rigid boundary ring 2, three main deformation beams 3 and three anti-overload auxiliary beams 4; wherein the rigid boundary block 1 is provided in the space surrounded by the rigid boundary ring 2, with an annular space being formed by the outer wall of the rigid boundary block and the inner wall of the rigid boundary ring 2, wherein the respective main deformation beams 3 and the anti-overload auxiliary beams 4 are uniformly distributed in the annular space around a set axis 5 and connect the rigid boundary ring 2 and the rigid boundary block 1; wherein the anti-overload auxiliary beam 4 is provided with a wire cut groove running through along the length direction of the set axis 5, the cross section of the wire cut groove in the direction perpendicular to the set axis 5 comprises two parallel boundary lines 41 having a distance less than or equal to 0.18 mm therebetween; and wherein the boundary line 41 is one of a curve, a combined line of at least two straight lines, and a combined line of straight line and curve, and is in an axisymmetric or centrosymmetric pattern.

Figure 2:
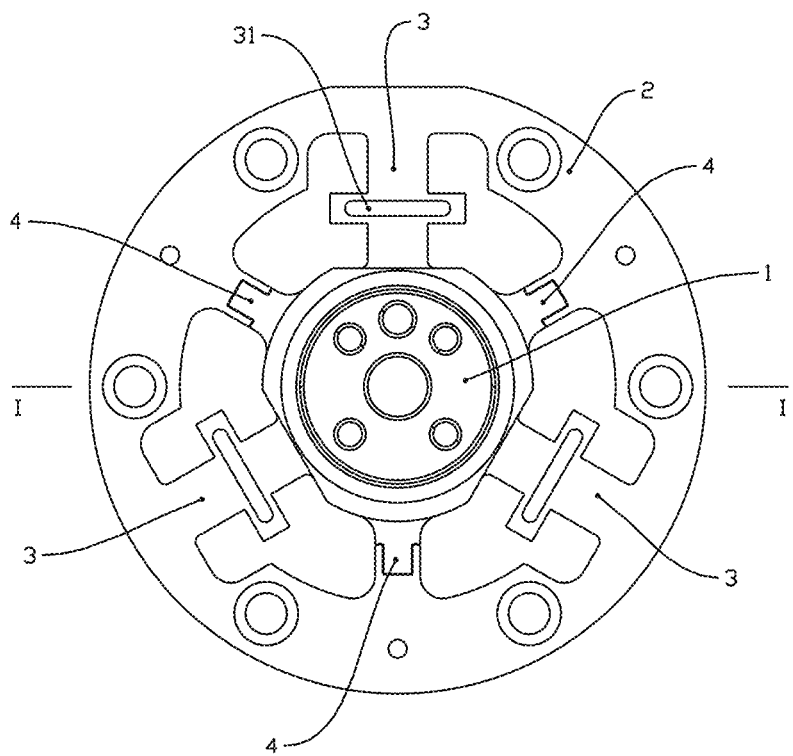
FIG. 2 is a front view of the anti-overload sensor elastic body in Embodiment 1.

FIGS. 1 and 2 illustrate the structural form of the anti-overload sensor elastic body according to the present invention. The problem discussed in the background is effectively solved by providing three anti-overload auxiliary beams 4. Specifically, by providing wire cut grooves on the anti-overload auxiliary beams 4, and by controlling the width of the grooves within 0.18 mm, the overload of the sensor in directions other than the set axis 5 is effectively prevented, avoiding destructive damage and increasing the safety of the sensor. The elastic body is integrally processed to avoid poor accuracy caused by the assembly of the elastic body itself. The integrated processing effectively improves accuracy.

Figure 3:
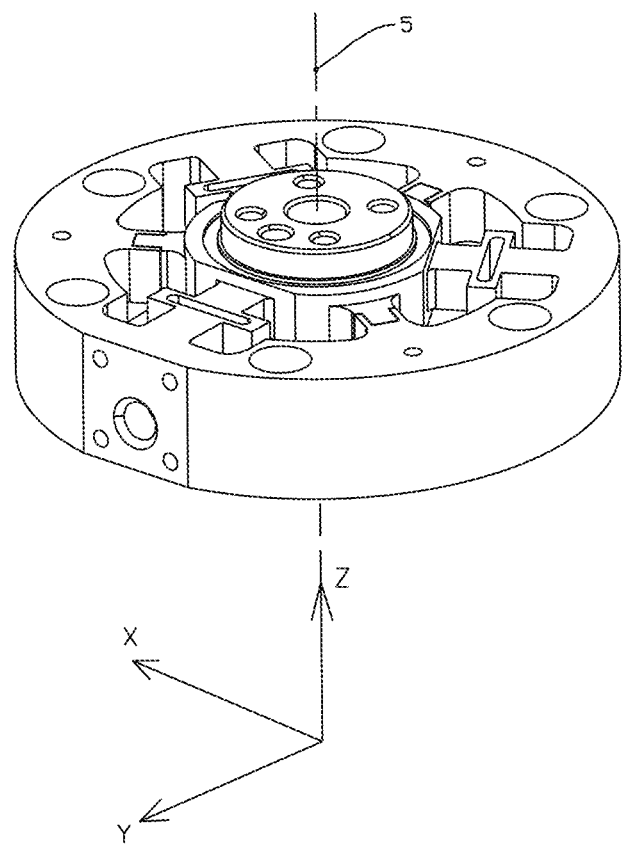
FIG. 3 is a schematic diagram of the structure of the anti-overload sensor elastic body in Embodiment 1 at a second angle (with a corresponding coordinate system established)

In the present invention, reference is made to the coordinate system shown in FIG. 3, which takes the set axis 5 as the Z-axis. In the above embodiment, the expression "other directions" refers to directions other than the Z-axis in the coordinate system.

In the above embodiment, an included angle of 60° is formed between the main deformation beam 3 and the anti-overload auxiliary beam 4 in a plane composed of the X-axis and Y-axis in FIG. 3. The formation of this included angle causes the deformation of the main deformation beam 3 to produce different degrees of deformation on the anti-overload auxiliary beam 4, and said deformation causes at least partial attachment of the side walls of the wire cut groove, achieving the purpose of limiting overload.

In the present invention, various line forms of the boundary line 41 as an axisymmetric or centrosymmetric pattern need to be implemented so that the deformation of the anti-overload auxiliary beam 4 in the directions other than the Z-axis can cause at least partial attachment of the two side walls of the wire cut groove due to changes in relative position.

Figure 4:
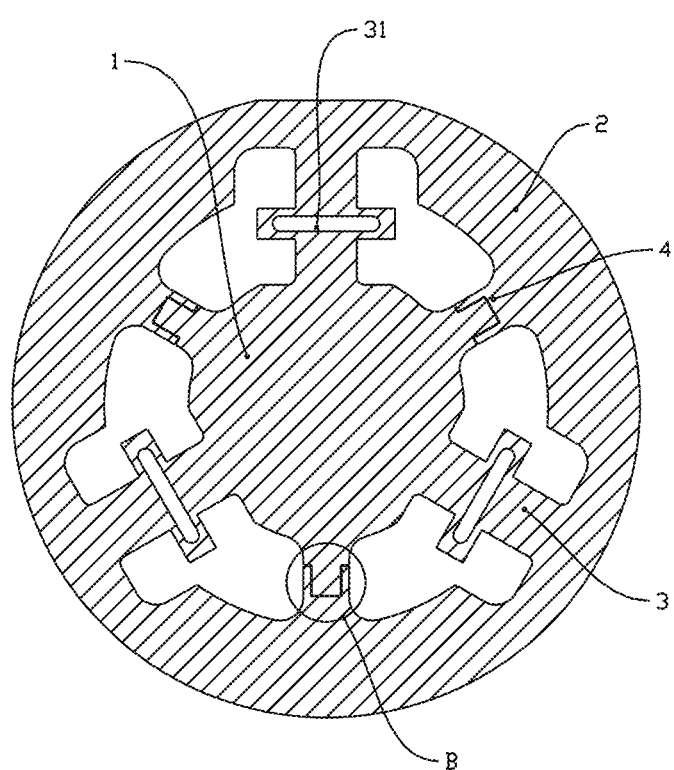
FIG. 4 is a cross-sectional view of the anti-overload sensor elastic body in Embodiment 1 in the direction perpendicular to the direction of the set axis.
Figure 5:
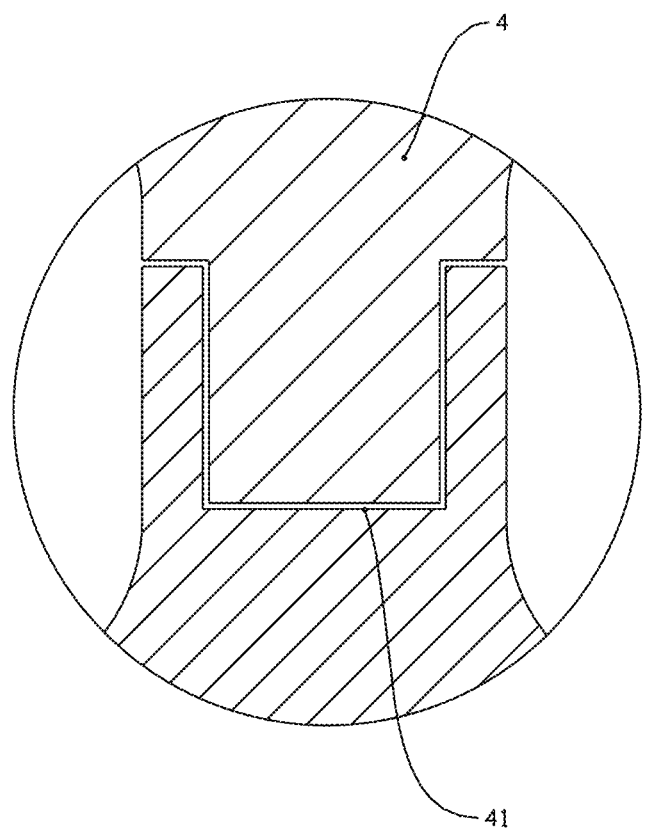
FIG. 5 is a partially enlarged view at B in FIG. 4.
Figure 6:
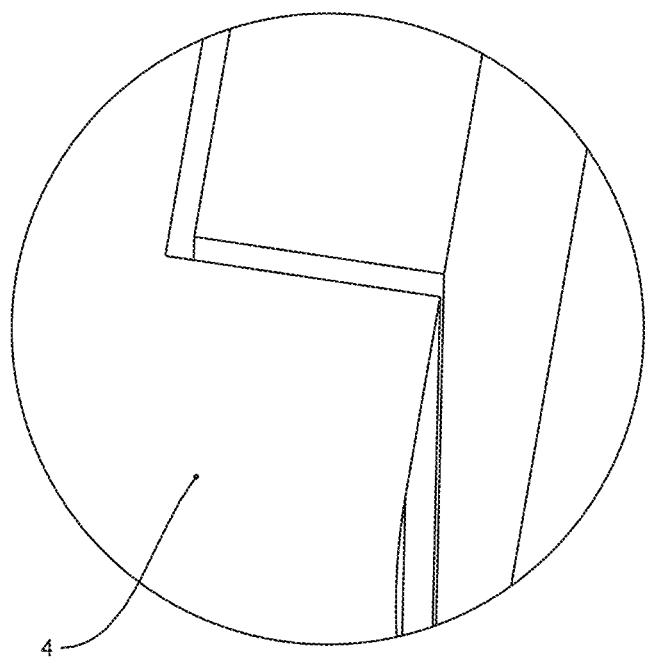
FIG. 6 is a partially enlarged view at A in FIG. 1.
Figure 7:
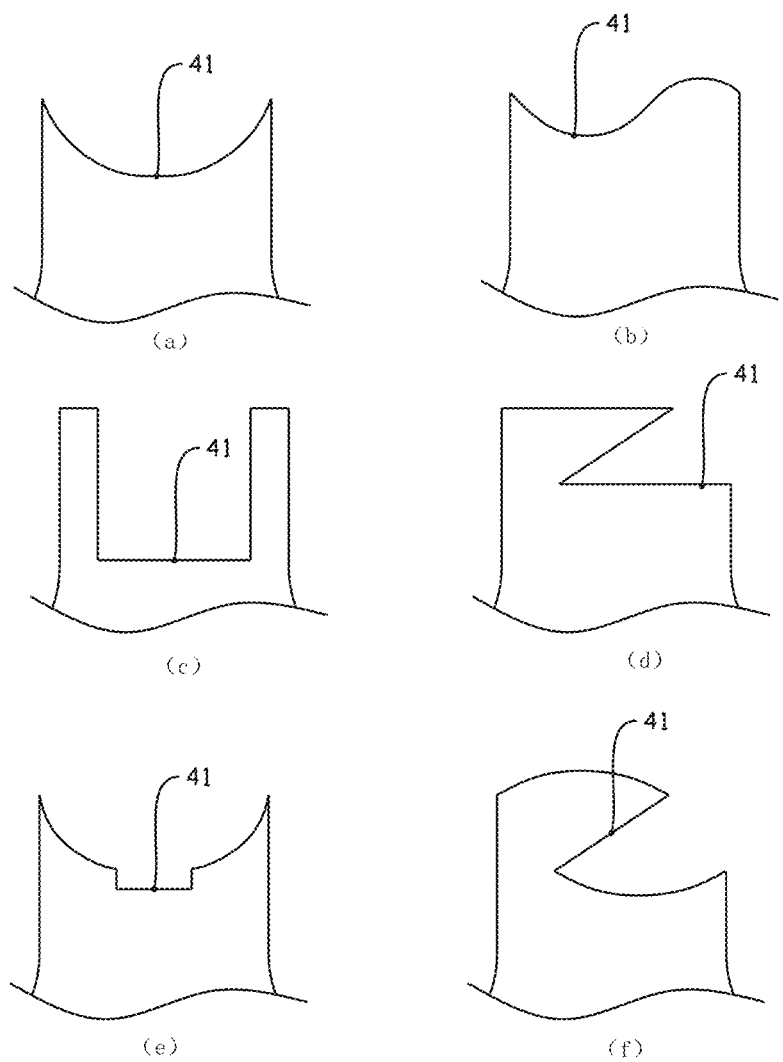
FIG. 7 is a schematic diagram of the shapes of six boundary lines (a) to (f)
Figure 8:
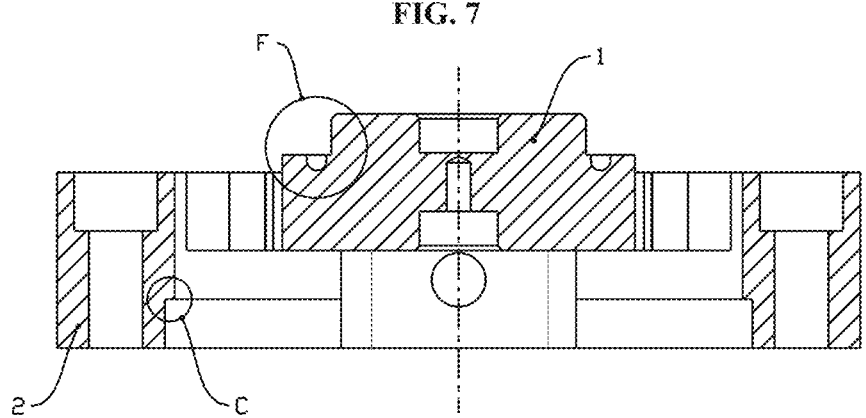
FIG. 8 is a sectional view at I-I in FIG. 2.
Figure 9:
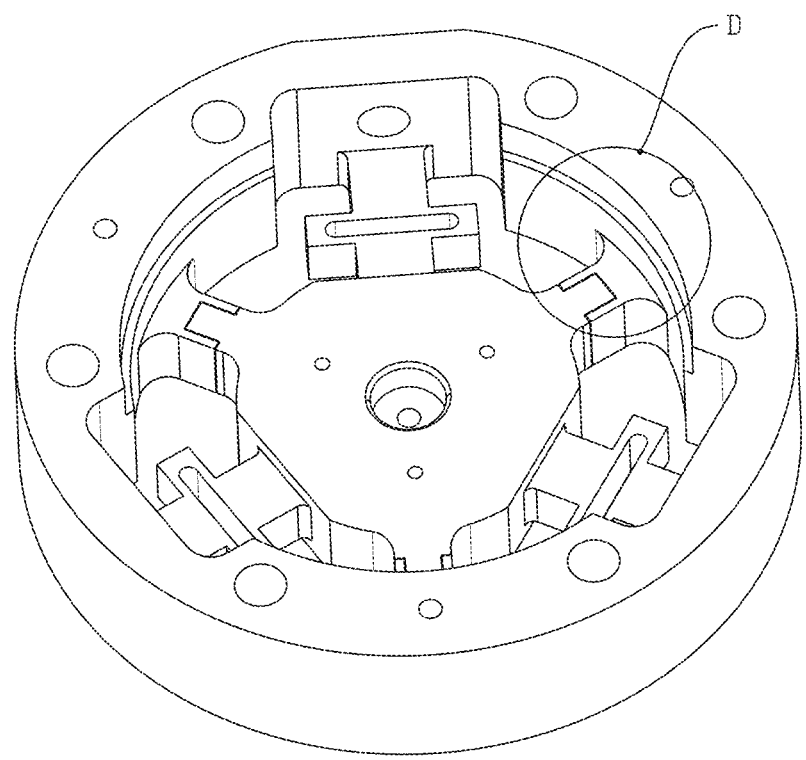
FIG. 9 is a schematic diagram of the structure of the anti-overload sensor elastic body in Embodiment 1 at a third angle.
Figure 10:
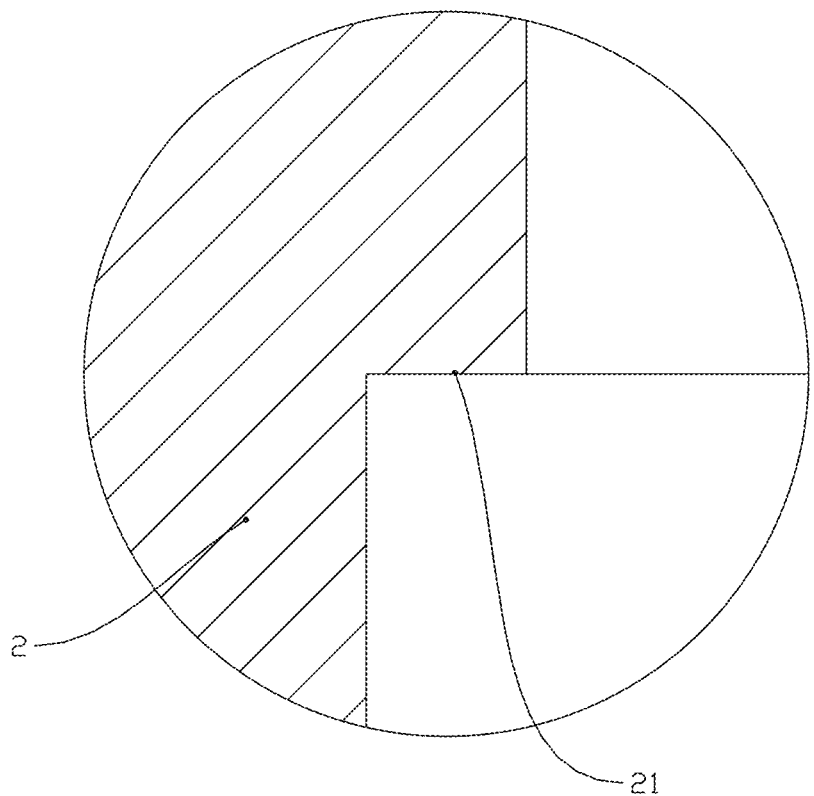
FIG. 10 is a partially enlarged view at C in FIG. 8.
Figure 11:
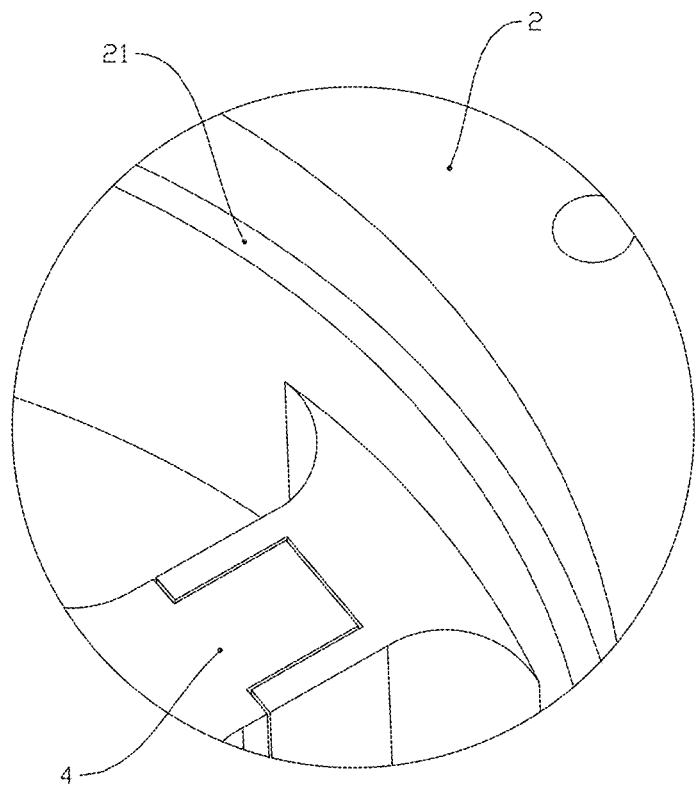
FIG. 11 is a partially enlarged view at D in FIG. 9.

In FIG. 4, a cross-sectional view of the entire anti-overload sensor elastic body in a direction perpendicular to the set axis 5 is shown. The position of the boundary line 41 can be identified from FIG. 5, which is partially enlarged, and the two side walls of the wire cut groove can be identified from FIG. 6. In the case where the boundary line 41 in the form of a curve, as shown in FIGS. 7(a) and (b), two specific forms are shown, including an axisymmetric curve, such as an arc, and a centrosymmetric curve, such as a S-shaped curve. Of course, the above two curves are single smooth transition curves. When the boundary line 41 is composed of two curves, even if there is a relatively obvious inflection point in the middle, it is still within the scope of protection of the present invention. In the case where the boundary line 41 is a combined line of at least two straight lines, as shown in FIGS. 7(c) and (d), two specific forms are likewise shown, including an axisymmetric hat-shaped line, and a centrosymmetric Z-shaped line. In the case where the boundary line 41 is a combined line of a straight line and a curve, it is generally considered to be an irregular line, as shown in FIGS. 7(e) and (f), which show an axisymmetric irregular line and a centrosymmetric irregular line, respectively. The six line forms in FIG. 7 only illustrate some embodiments of the present invention, and other line forms that can achieve the technical objectives of the present invention are also within the scope of protection of the present invention.

In use, the rigid boundary block 1 and the rigid boundary ring 2 are respectively connected to different external structures, so that the main deformation beam 3 and the anti-overload auxiliary beam 4 are deformed to sense the axial force in the process that one of the external structures drives the other external structure through the entire elastic body. Therefore, in order to facilitate installation with the external structures, as a preferred implementation of the above embodiment, the rigid boundary block 1 protrudes outward relative to the rigid boundary ring 2 in one direction of the set axis 5, and the rigid boundary ring 2 protrudes outward relative to the rigid boundary block 1 in the opposite direction.

A portion of the rigid boundary block 1 protruding relative to rigid boundary ring 2 is used to establish a connection with one of the external structures, while the space created inside the rigid boundary ring 2 due to the indentation of rigid boundary block 1 is used for the installation of wiring harnesses and other structures.

As a preferred implementation of the above embodiment, the inner wall of the rigid boundary ring 2 is provided with an annular limiting surface 21 perpendicular to the set axis 5 and configured to limit the external structure led out relative to the rigid boundary block 1, the external structure being fixedly connected to the rigid boundary block 1. In the above embodiment, the limiting effect in directions other than the Z-axis is achieved. Obviously, risks still exist in use. In order to further improve the service performance of the whole product, the optimization shown in FIGS. 8 to 11 is carried out in the present invention by providing a limiting structure for preventing overload in the Z-axis direction in FIG. 3. Of course, the limiting structure has a limiting effect on the external structure relative to the elastic body. Since the overload prevention is based on the deformation of the deformation beams caused by the relative position between the rigid boundary block 1 and the rigid boundary ring 2, the external structure needs to be fixedly connected to the rigid boundary block 1, so as to play a limiting role by contacting with the rigid boundary ring 2.

Preferably, the limiting surface 21 is provided on the inner wall of a portion of the rigid boundary ring 2 that protrudes with respect to the rigid boundary block 1. In this way, the structural design and installation of the external structure is made easier.

Figure 12:
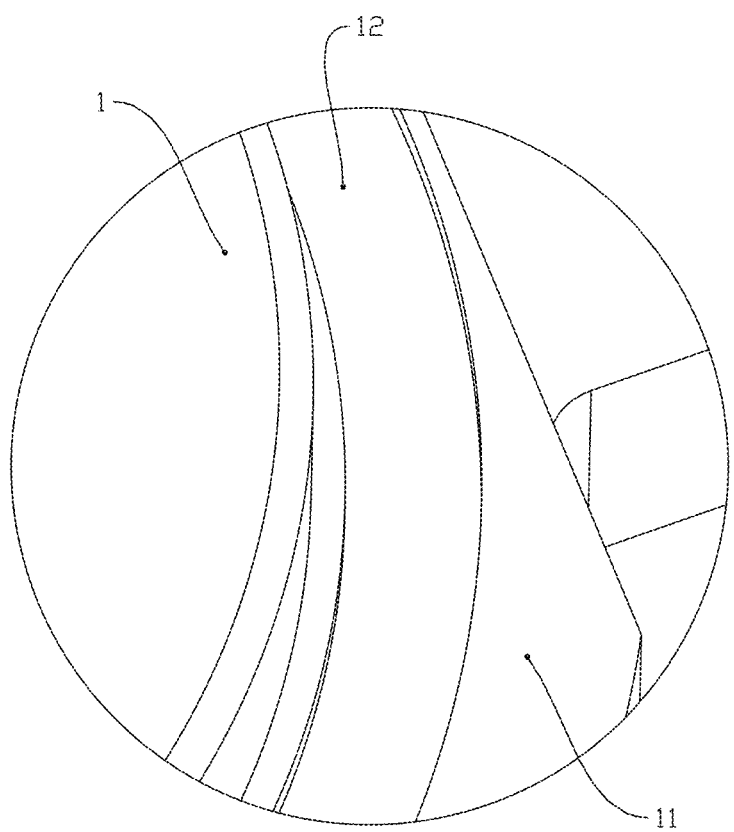
FIG. 12 is a partially enlarged view at E in FIG. 1.
Figure 13:
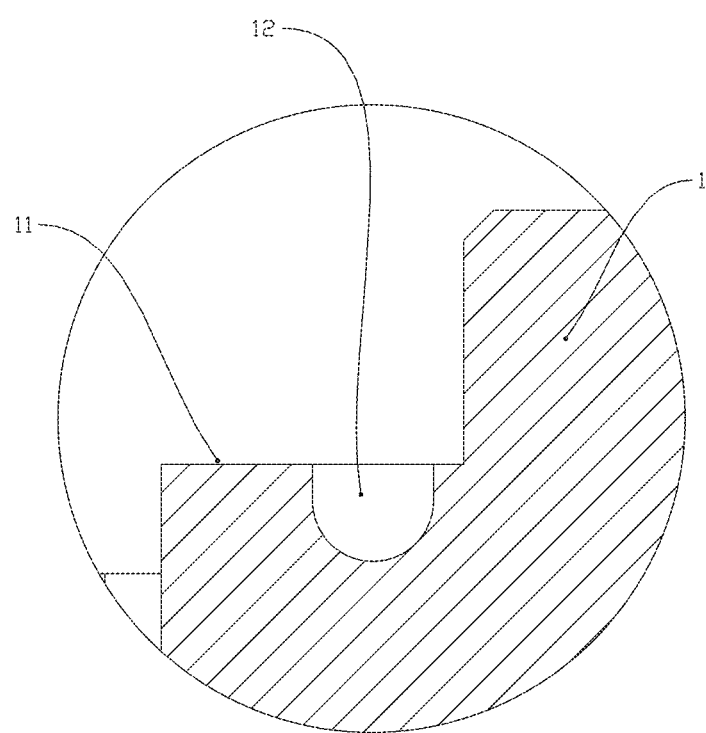
FIG. 13 is a partially enlarged view at F in FIG. 8.

In use, since the rigid boundary block 1 needs to be fixedly connected to the external structure, the elastic body necessarily needs to be led out when it is used in a specific sensor product structure. In such configuration, it is difficult to seal the sensor product. To solve this problem, as a preferred implementation of the elastic body, as shown in FIGS. 12 and 13, the outer wall of rigid boundary block 1 is provided with an annular mounting surface 11 perpendicular to the set axis 5.

With the annular mounting surface 11, better sealing can be achieved after the entire elastic body is installed on the sensor product. The sealing here can also be improved by an external flexible sealing structure. The mounting surface 11 provides an installation position for the flexible sealing structure. When necessary, it is also allowed to provide a sealing groove 12 to install the flexible sealing structure. The flexible sealing structure is used to seal the gap between an external cover led out relative to the rigid boundary ring 2 and the rigid boundary block 1. The external cover is fixedly connected to the rigid boundary ring 2. Of course, the flexible sealing structure described above is hidden in the sensor product, which is an optimized implementation. Other flexible sealing structures that are locally or completely external are also within the scope of protection of the present invention.

In the above optimized structure, when the flexible sealing structure is installed in place, it is necessary to ensure that it protrudes from the mounting surface 11 in order to achieve fitting with the external cover, thus ensuring the sealing effect. Moreover, it should be emphasized that the use of the flexible sealing structure also requires that a gap be formed between the mounting surface 11 and the external cover, so as to ensure change in the relative position between the rigid boundary block 1 and the rigid boundary ring 2, thus allowing the deformation between the main deformation beam 3 and the anti-overload auxiliary beam 4. The flexible sealing structure in the above embodiment can not only prevent dust, but also prevent splashing. With complete internal sealing treatment, it can reach up to IP67.

As a preferred implementation of the above embodiment, the main deformation beam 3 is provided with a deformation cavity 31 running through along the direction of the set axis 5. The cross-sectional shape of the deformation cavity 31 in the present invention includes but is not limited to square, circular, gourd, etc. The deformation cavity 31 in the main deformation beam 3 is mainly used to convert the deformation of the main deformation beam 3 into a deformation with one side fixed, avoiding a deformation with both sides completely fixed, which may affect the deformation effect of the sensor.

Embodiment 2

Figure 14:
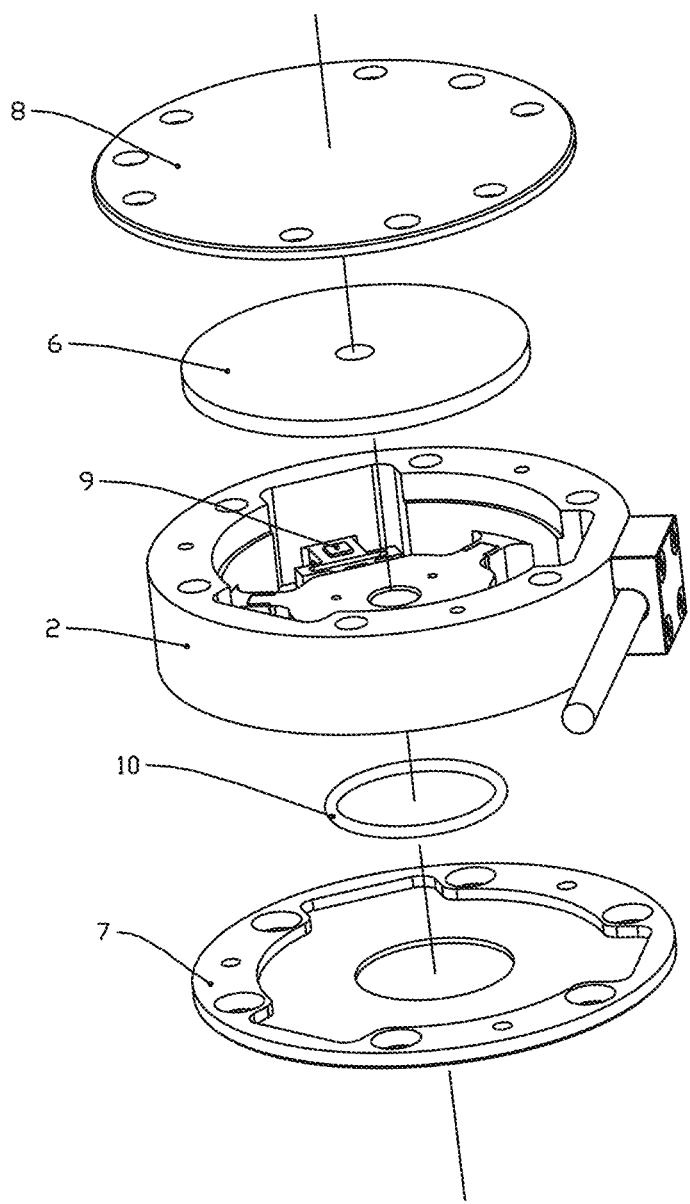
FIG. 14 is an exploded schematic view of the six-axis force sensor in Embodiment 2.
Figure 15:
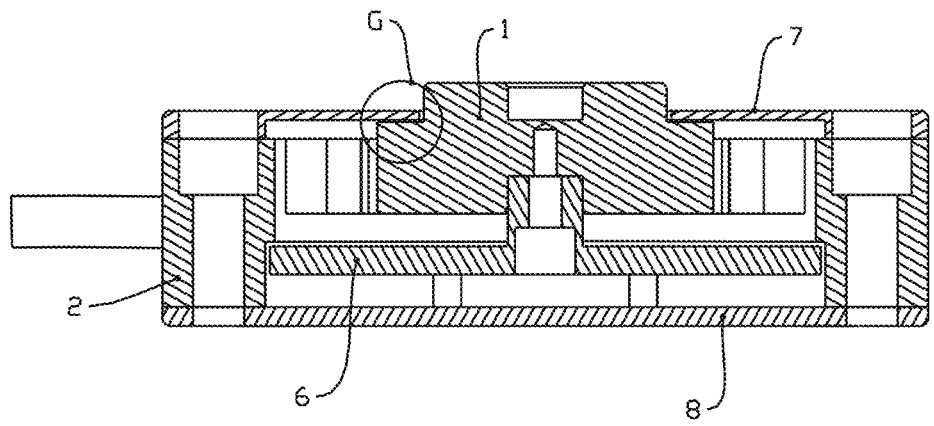
FIG. 15 is a cross-sectional view of a six-axis force sensor in Embodiment 2.

Reference is made to FIGS. 14 and 15.

A six-axis force sensor adopting the anti-overload sensor elastic body as described in the Embodiment 1 further comprises an overload protection plate 6, a first end cover 7, a second end cover 8 and a plurality of strain sensitive elements 9; wherein the overload protection plate 6 is fixedly connected to one end of the rigid boundary block 1 that is indented inwardly relative to the rigid boundary ring 2, and contacts with the limiting surface 21 when the deformation of the main deformation beam 3 in the direction of the set axis 5 reaches a set value; wherein the first end cover 7 is configured to be penetrated by a portion of the rigid boundary block 1 protruding from the rigid boundary ring 2, and is fixedly connected to one end of the rigid boundary ring 2, the penetration position being spaced apart from the rigid boundary block 1; wherein the second end cover 8 is fixedly and sealingly connected to the other end of the rigid boundary ring 2; and wherein a mounting cavity accommodating the main deformation beams 3 and the anti-overload auxiliary beams 4 is formed between the first end cover 7, the second end cover 8 and the rigid boundary ring 2, and wherein the strain sensitive elements 9 fit against the surface of the main deformation beams 3.

The present invention provides a six-axis force sensor adopting the anti-overload sensor elastic body as described in the above embodiment. With the overload protection plate 6, it further realizes overload protection in the direction of the set axis 5, in addition to overload protection in directions other than the set axis 5.

Figure 16:
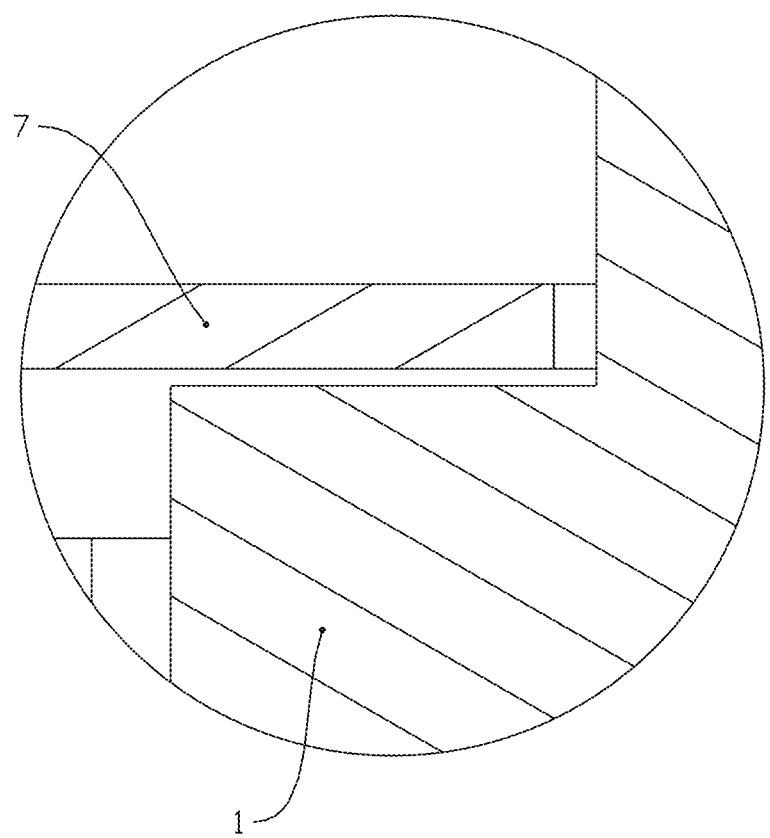
FIG. 16 is a partially enlarged view at G in FIG. 15.

Specifically, when the deformation of the main deformation beam 3 in the direction of the set axis 5 reaches a set value, the overload protection plate 6 comes into contact with the limiting surface 21, thereby limiting the deformation and achieving the purpose of overload protection. It is necessary that the penetration position of the first end cover 7 is spaced apart from the rigid boundary block 1. FIG. 16 shows the gap between them, the presence of which avoids forming obstacles to deformation. The gap between the overload protection plate 6 and the elastic body is adjusted according to the actual design, so that the overload protection of the sensor can be realized in a simple and convenient way. The gap is required to be within the maximum deformation range of the sensor design.

In order to better fix the overload protection plate 6, as shown in FIG. 15, a local protrusion can be provided at the center of the overload protection plate 6, and a corresponding depression can be provided at the center of the rigid boundary block 1. Better fixing can be realized by inserting the protrusion into the depression with the two fitting each other. Of course, it is necessary to provide connecting pieces to fix them. By controlling the length of the protrusion, the gap between the overload protection plate 6 and the rigid deformation block 1 can be adjusted.

The first end cover 7 and the second end cover 8 enable the final sensor to be relatively sealed as a whole. Of course, in order to further ensure the sealing effect, as a preferred implementation of the above embodiment, a flexible sealing structure 10 is provided between the first end cover 7 and the rigid boundary block 1. In this way, on the basis of the sealing connection between the second end cover 8 and the rigid boundary ring 2, effective sealing can be achieved in the entire mounting cavity. Of course, the installation position of the sealing structure here is not specifically limited, but it is required that the flexibility needs to reach a set degree, so as to avoid affecting the deformation between the respective deformation beams.

The flexible sealing structure 10 can be mounted at a position provided on the periphery of the rigid boundary block 1 and parallel to the limit surface 21, so that it can be effectively pressed between the first end cover 7 and the rigid boundary block 1. In order to ensure the installation effect, the flexible sealing structure 10 can be partially embedded in the mounting position or in the first end cover 7.

In order to achieve the above-mentioned flexibility, as a preferred implementation, the flexible sealing structure 10 can be provided with a hollow cavity filled with gas, so that when the main deformation beam 3 and the anti-overload auxiliary beam 4 are deformed in any direction, the adaptive sealing can be quickly realized by the redistribution of the gas in the hollow cavity, and the resistance to the relative movement between the first end cover 7 and the rigid boundary block 1 can be reduced. The first end cover 7 in this embodiment is the external cover in Embodiment 1, and the overload protection plate 6 is the external structure in Embodiment 1.

Embodiment 3

Figure 17:
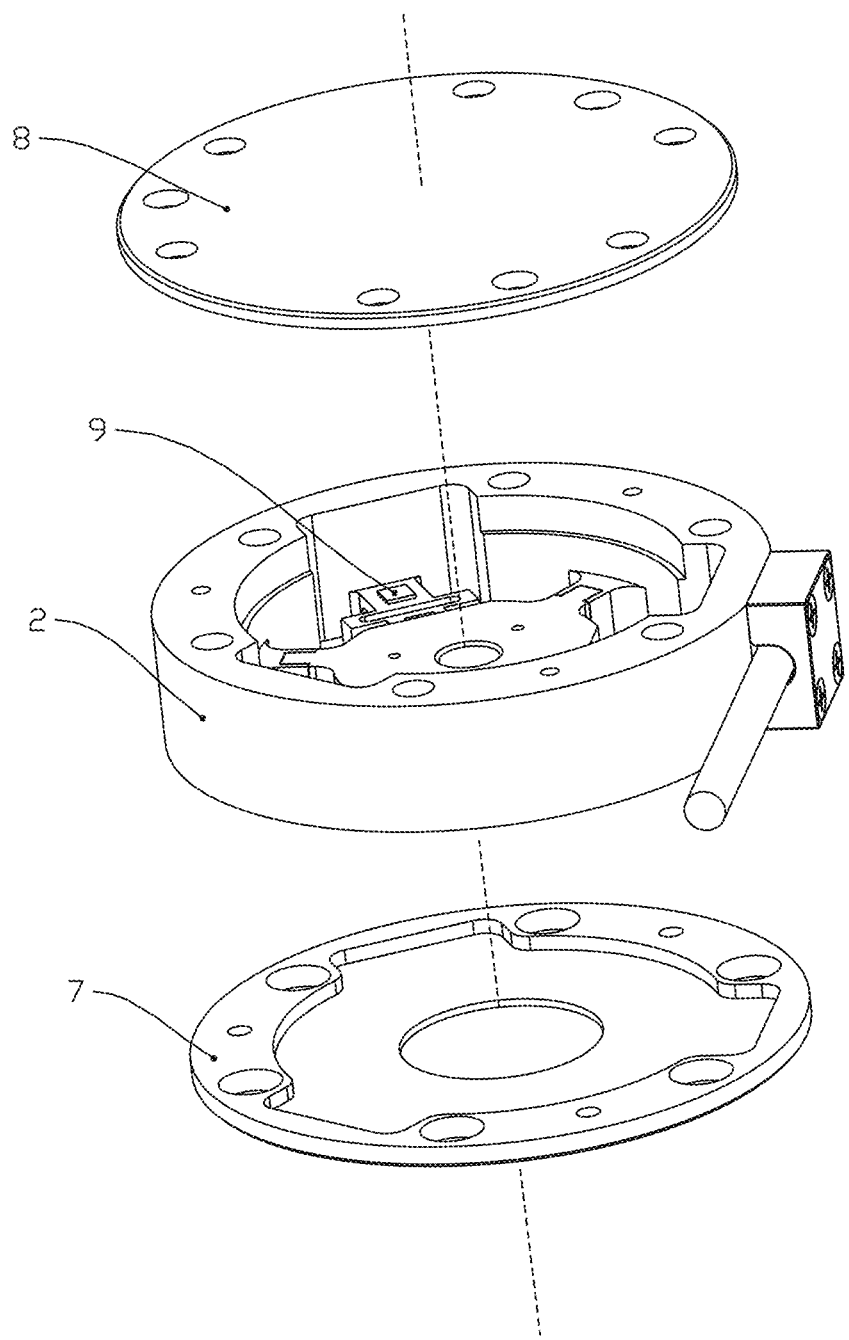
FIG. 17 is an exploded schematic view of the six-axis force sensor in Embodiment 3.
Figure 18:
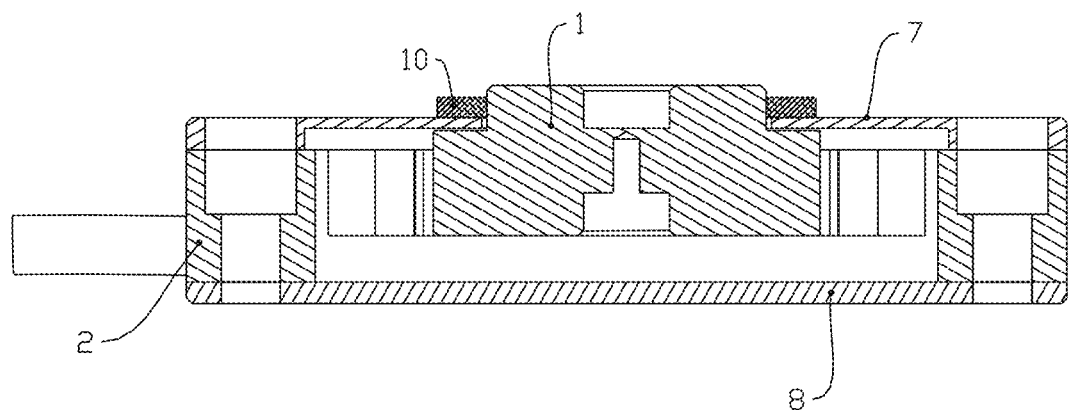
FIG. 18 is a cross-sectional view of a six-axis force sensor in Embodiment 3.
Figure 19:
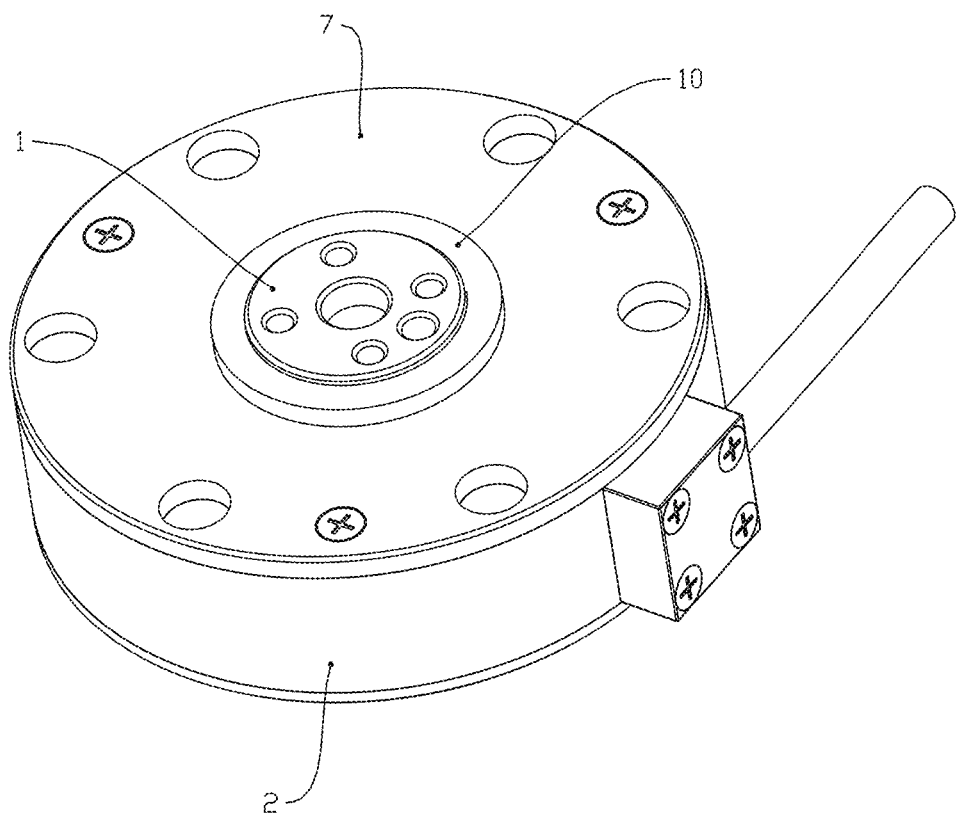
FIG. 19 is a schematic diagram of the structure of the six-axis force sensor in Embodiment 3.

Reference is made to FIGS. 17 to 19. A six-axis force sensor adopting the anti-overload sensor elastic body as described in the Embodiment 1 further comprises a first end cover 7, a second end cover 8 and a plurality of strain sensitive elements 9; wherein the first end cover 7 is configured to be penetrated by a portion of the rigid boundary block 1 protruding from the rigid boundary ring 2, and is fixedly connected to one end of the rigid boundary ring 2, and the inner side of the first end cover 7 is spaced apart from the mounting surface 11; wherein the first end cover 7 contacts with the mounting surface 11 when the deformation of the main deformation beams 3 in the direction of the set axis 5 reaches a set value; wherein the second end cover 8 is fixedly and sealingly connected to the other end of the rigid boundary ring 2; and wherein a mounting cavity accommodating the main deformation beams 3 and the anti-overload auxiliary beams 4 is formed between the first end cover 7, the second end cover 8 and the rigid boundary ring 2, and wherein the strain sensitive elements 9 fit against the surface of the main deformation beams 3.

As compared with the Embodiment 2, the overload protection position in the direction of the set axis 5 is changed in this embodiment. By endowing the first end cover 7 with two functions including sealing and limiting, it can obtain a smaller product volume compared with the Embodiment 2 in which an independent overload protection plate 6 is provided.

Specifically, when the deformation of the main deformation beam 3 in the direction of the set axis 5 reaches a set value, the first end cover 7 comes into contact with the mounting surface 11, thereby limiting the deformation limit and achieving the purpose of overload protection.

As a preferred implementation of this embodiment, a flexible sealing structure 10 is provided outside the first end cover 7 to seal the gap between the first end cover 7 and the rigid boundary block 1. The flexible sealing structure 10 here needs to adapt to the structural arrangement of the first end cover 7 and the rigid boundary block 1, and of course, sufficient flexibility also needs to be ensured. The use of the flexible sealing structure 10 can achieve sealing requirements while minimizing its impact on the sensor deformation. The flexible sealing structure has low stiffness and good sealing performance, which can improve the protection level of the sensor while ensuring the measurement accuracy of the sensor.

Embodiment 4

Figure 20:
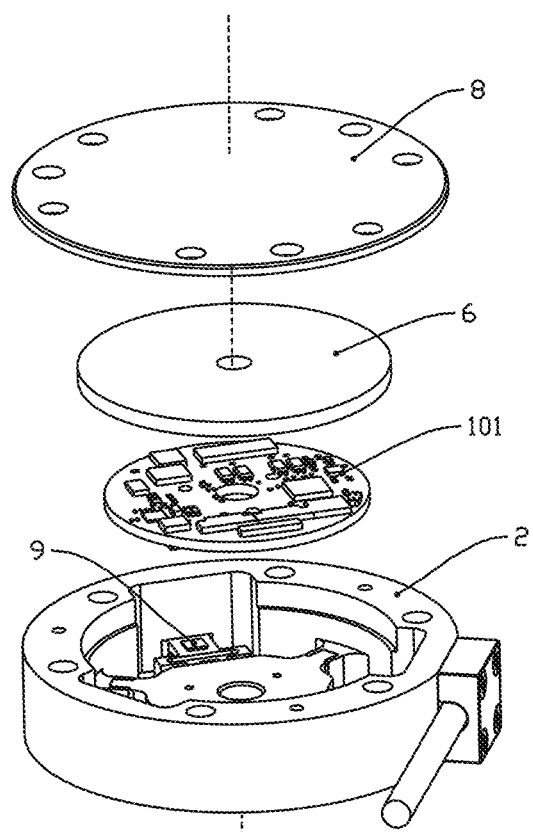
FIG. 20 is an exploded schematic view of the six-axis force sensor in Embodiment 4.
Figure 21:
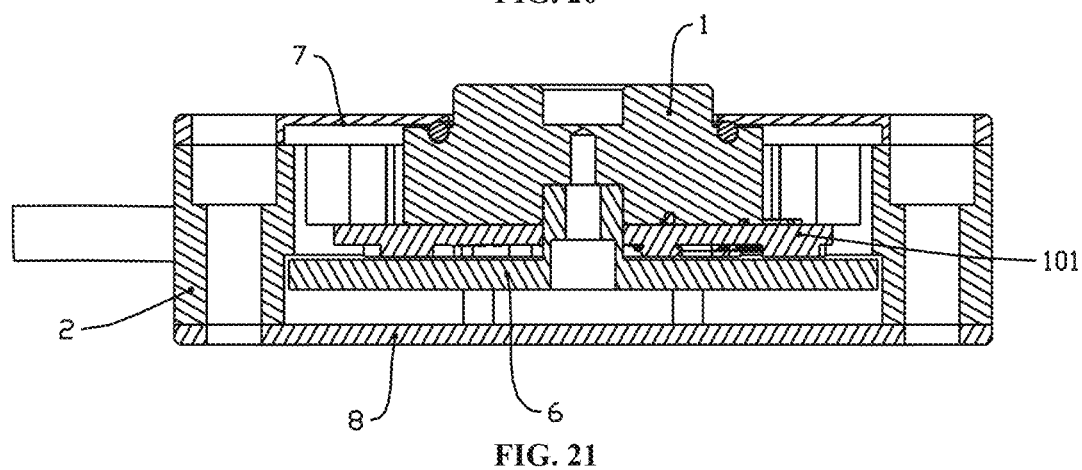
FIG. 21 is a cross-sectional view of a six-axis force sensor in Embodiment 4.

On the basis of the Embodiment 2 or 3, and as a preferred implementation, as shown in FIGS. 20 and 21, it further comprises an embedded circuit 101 provided in the mounting cavity and fixedly connected to the rigid boundary block 1.

The elastic body will deform slightly under the action of multiaxial force, and the strain sensitive element 9 on it can measure the deformation in real time and convert it into millivolt voltage signal. By embedding a high-precision circuit in the elastic body, it is possible to collect millivolt voltage signals in real time, and subject the signals to real-time iterative decoupling to output the actual force value of the elastic body, realizing high anti-interference and long-distance transmission. The integrated embedded circuit 101 can be better applied to multiple industrial environments, providing digital signals directly, enhancing the universality of the product. By using digital signals, long-distance transmission can be achieved, with a transmission distance of no less than 50-100 m, which solves the problem that analog signals will be obviously disturbed after 5 m transmission. The digital circuit stores and collects data in real-time and can process the data in a limited way. The most original data can be kept in the circuit board, and will not be lost due to data transmission.

The assembly process of a six-axis force sensor adopting the embedded circuit 101 in the present invention is described in detail taking the configuration form in the Embodiment 2 as an example.

In the production process, the strain sensitive element 9 is first adhered to the main deformation beam 3, and then connected to the embedded circuit 101 by bonding wires. The embedded circuit 101 can be fixed to the rigid boundary block 1 by connecting pieces such as screws and the like. Then, waterproof cables and lead joints can be connected. The lead joints of the sensor in the present invention adopt a new structural form and have a protective design to ensure that the lead joints are as few as possible, and can be sealed with grease to effectively prevent water intrusion.

After the above assembly is completed, the overload protection plate 6 is connected and installed to the rigid boundary block 1. The overload protection plate 6 can be provided with a screw hole, which is matched with the threaded hole or the like on the sensor elastic body. The embedded circuit 101 is preferably arranged between the overload protection plate 6 and the rigid boundary block 1.

Finally, the flexible sealing structure 10 is placed in the sealing groove 12, and the first end cover 7 is fixed by screws or the like. After the above process is completed, the second end cover 8 can be fixed by screws or the like in the same way.

The basic principles, main features and advantages of the present invention have been shown and described above. Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. An anti-overload sensor elastic body in form of an integral structure, comprising a rigid boundary block, a rigid boundary ring, three main deformation beams, three anti-overload auxiliary beams, an overload protection plate, a first end cover, a second end cover and a plurality of strain sensitive elements;
   wherein the rigid boundary block is configured to be provided in the space surrounded by the rigid boundary ring, with an annular space configured to be formed by an outer wall of the rigid boundary block and an inner wall of the rigid boundary ring, wherein the respective main deformation beams and the anti-overload auxiliary beams are configured to be uniformly distributed in the annular space around a set axis and to connect the rigid boundary ring and the rigid boundary block;
   wherein the anti-overload auxiliary beam is configured to be provided with a wire cut groove running through along a length direction of the set axis, the cross section of the wire cut groove in a direction perpendicular to the set axis comprises two parallel boundary lines having a distance less than 0.18 mm therebetween;
   wherein at least one of the boundary lines is one of a curve, a combined line of at least two straight lines, and a combined line of straight line and curve, and is in an axisymmetric or centrosymmetric pattern,
   wherein the rigid boundary block is configured to protrude outward relative to the rigid boundary ring in one direction of the set axis, and the rigid boundary ring is configured to protrude outward relative to the rigid boundary block in an opposite direction;
   wherein the inner wall of the rigid boundary ring is configured to be provided with an annular limiting surface perpendicular to the set axis:
   wherein the overload protection plate is configured to be fixedly connected to one end of the rigid boundary block that is configured to be indented inwardly relative to the rigid boundary ring, and is configured to contact with the annular limiting surface when the deformation of the main deformation beam in the direction of the set axis reaches a set value;
   wherein the first end cover is configured to be penetrated by a portion of the rigid boundary block protruding from the rigid boundary ring, and is configured to be fixedly connected to one end of the rigid boundary ring, the penetration position configured to be spaced apart from the rigid boundary block;
   wherein the second end cover is configured to be fixedly and sealingly connected to an other end of the rigid boundary ring; and
   wherein a mounting cavity accommodating the main deformation beams and the anti-overload auxiliary beams is configured to be formed between the first end cover, the second end cover and the rigid boundary ring, and wherein the plurality of strain sensitive elements are configured to fit against respective surfaces of the main deformation beams.

2. The anti-overload sensor elastic body according to claim 1, wherein the main deformation beam is configured to be provided with a deformation cavity running through along the direction of the set axis.

3. The six-axis force sensor according to claim 1, wherein a flexible sealing structure is configured to be provided between the first end cover and the rigid boundary block.

4. A six-axis force sensor-comprising an anti-overload type sensor elastomer, a first end cover, a second end cover and a plurality of strain sensitive elements;
  wherein the anti-overload sensor elastomer is an integrated forming structure, and comprises a rigid boundary block, a rigid boundary ring, three main deformation beams and three anti-overload auxiliary beams;
  wherein the rigid boundary block is configured to be provided in the space surrounded by the rigid boundary ring, with an annular space configured to be formed by an outer wall of the rigid boundary block and an inner wall of the rigid boundary ring, wherein the respective main deformation beams and the anti-overload auxiliary beams are configured to be uniformly distributed in the annular space around a set axis and to connect the rigid boundary ring and the rigid boundary block;
  wherein the anti-overload auxiliary beam is configured to be provided with a wire cut groove running through along a length direction of the set axis, the cross section of the wire cut groove in a direction perpendicular to the set axis comprises two parallel boundary lines having a distance less than 0.18 mm therebetween and wherein at least one of the boundary lines is one of a curve, a combined line of at least two straight lines, and a combined line of straight line and curve, and is in an axisymmetric or centrosymmetric pattern;
  wherein the rigid boundary block is configured to protrude outward relative to the rigid boundary ring in one direction of the set axis, and the rigid boundary ring is configured to protrude outward relative to the rigid boundary block in an opposite direction;
  wherein the outer wall of the rigid boundary block is configured to be provided with an annular mounting surface perpendicular to the set axis;
  wherein the first end cover is configured to be penetrated by a portion of the rigid boundary block protruding from the rigid boundary ring, and is configured to be fixedly connected to one end of the rigid boundary ring, wherein the inner side of the first end cover is configured to be spaced apart from the annular mounting surface, and wherein the first end cover is configured to contact with the annular mounting surface when the deformation of the main deformation beams in the direction of the set axis reaches a set value;
  wherein the second end cover is configured to be fixedly and sealingly connected to an other end of the rigid boundary ring; and
  wherein a mounting cavity accommodating the main deformation beams and the anti-overload auxiliary beams is configured to be formed between the first end cover, the second end cover and the rigid boundary ring, and wherein the plurality of strain sensitive elements are configured to fit against respective surfaces of the main deformation beams.

5. The six-axis force sensor according to claim 4, wherein a flexible sealing structure is configured to be provided outside the first end cover to seal the gap between the first end cover and the rigid boundary block.

6. The six-axis force sensor according to claim 4, wherein the sensor comprises an embedded circuit configured to be provided in the mounting cavity and fixedly connected to the rigid boundary block.

* * * * *